United States Patent
Srivastava

(10) Patent No.: US 9,258,843 B2
(45) Date of Patent: Feb. 9, 2016

(54) WIRELESS MESH NETWORK CONFIGURATION

(75) Inventor: Praveen Srivastava, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 369 days.

(21) Appl. No.: 13/600,765

(22) Filed: Aug. 31, 2012

(65) Prior Publication Data

US 2014/0064181 A1    Mar. 6, 2014

(51) Int. Cl.
*H04W 4/00* (2009.01)
*H04W 84/18* (2009.01)

(52) U.S. Cl.
CPC ..................... *H04W 84/18* (2013.01)

(58) Field of Classification Search
None
See application file for complete search history.

(56) References Cited

U.S. PATENT DOCUMENTS

| | | | |
|---|---|---|---|
| 7,496,078 B2* | 2/2009 | Rahman | 370/338 |
| 7,711,004 B2* | 5/2010 | Xu | 370/468 |
| 2008/0080414 A1* | 4/2008 | Thubert et al. | 370/328 |
| 2011/0164527 A1* | 7/2011 | Mishra et al. | 370/252 |

\* cited by examiner

*Primary Examiner* — Willie J Daniel, Jr.
(74) *Attorney, Agent, or Firm* — Chapin IP Law, LLC

(57) ABSTRACT

A wireless mesh network employs an integrated interface between a plurality of access points for mitigating throughput degradation of multiple consecutive "daisy chain," or mesh, links. The mesh network employs a plurality of access points, each linked back to a root access point by a series of "hops" through other access points. The wireless mesh network, therefore, employs a plurality of access points operable for wireless links to subscriber, or user, devices, including cellular phones, smart phones, tablet and laptop computing devices, or any suitable portable or handheld computing device. Access points establish an integrated interface with an adjacent access point for direct coupling of the access points for message traffic. The resulting integrated access point establishes a wireless link to a root access point connected to a backhaul network from which media services emanate.

20 Claims, 7 Drawing Sheets

---

200
IDENTIFY, IN A WIRELESS MESH NETWORK HAVING ACCESS POINTS WIRELESSLY COUPLED BY NETWORK LINKS, AN INTEGRATED INTERFACE TO AN ACCESS POINT, THE INTEGRATED INTERFACE BEING A DIFFERENT TRANSPORT MEDIUM THAN THE NETWORK LINKS

↓

201
RECEIVE, VIA AN INTEGRATED INTERFACE WITH AN ACCESS POINT, A MESSAGE PACKET FROM A USER DEVICE, THE INTEGRATED INTERFACE COUPLING THE ACCESS POINT INDEPENDENTLY OF THE WIRELESS MESH NETWORK LINKS

↓

202
FORWARD, VIA A SINGLE WIRELESS HOP, THE MESSAGE PACKET TO A ROOT ACCESS POINT, THE ROOT ACCESS POINT RESPONSIVE TO A PLURALITY OF ACCESS POINTS IN THE MESH NETWORK

WIRELESS MESH NETWORK CONFIGURATION

BACKGROUND

Wireless mesh networks aggregate a plurality of wireless nodes coupled with wireless links similar to a wired network fabric. Mesh networks provide a logical extension to individual "WiFi hotspots" by inserting multiple wireless routing/forwarding entities between a wireless gateway to a wired network, such as the Internet, and the end user subscriber device. In a typical mesh network, a plurality of access points establish wireless links to other access points to define a wireless path back to a root access point via a series of hops over each of the wireless links. Each of the access points provides wireless coverage to user devices within range, and also couples to other access points within range for extending the wireless reach.

SUMMARY

A wireless mesh network employs an integrated interface between a plurality of access points for mitigating throughput degradation of multiple consecutive "daisy chain," or mesh, links. The mesh network employs a plurality of access points, each linked back to a root access point by a series of "hops" through other access points. Conventional approaches limit the number of daisy chained hops that the mesh network may maintain. Since, in a typical arrangement, each hop must receive from a prior node and forward to a successive node, bandwidth is roughly halved at each daisy chained hop, therefore limiting the number of usable hops based on bandwidth requirements.

The wireless mesh network, therefore, employs a plurality of access points operable for wireless links to subscriber, or user, devices, including cellular phones, smart phones, tablet and laptop computing devices, or any suitable portable or handheld computing device. Access points establish an integrated interface with an adjacent access point for direct coupling of the access points for message traffic transported between them. The access point establishes a wireless link to a root access point connected to a backhaul network from which media services emanate. The access point maintains a first-hop link to the root access point, and forwards traffic to the adjacent (direct coupled) access point for serving user devices coupled directly or indirectly (via other mesh network links to other access points) to the access point. The access point eliminates intermediate links to the root access point, and the direct coupling via the integrated interface allows connections through daisy chaining to other mesh network access points so as not to exceed a maximum number of mesh network hops to an access point for providing acceptable performance, or bandwidth, to the subscriber device.

Configurations herein are based, in part, on the observation that multiple wireless access points may extend the wireless reach from a wireless root access point by daisy chaining the wireless links across intermediate access points. Each access point therefore defines a node in the mesh network having links to other nodes within range. Unfortunately, conventional arrangements suffer from the shortcoming that that conventional mesh network configurations experience a performance drop as the number of daisy chained access points increases. Since each node must receive and then forward each message packet, overhead increases and throughput drops exponentially with the number of daisy chained hops, or links.

Accordingly, configurations herein substantially overcome the above described shortcomings by providing a high-gain directional link on a first hop from the root access point, and provide an integrated wired interface between the first hop access point and an adjacent access point to mitigate the performance drop. Subsequent daisy chained nodes need only incur a single hop to the integrated access point and the adjacent access point, and subsequent daisy chained nodes may then extend the reach up to the maximum number of links defining an acceptable performance drop (typically 3 hops). In this manner, the access points and adjacent access points coupled by the integrated interface are dispersed at various ranges around the desired coverage area, and need not incur extensive mesh hops back to the root access point.

In further detail, the method of wireless data transport in a wireless mesh network includes identifying, in a wireless mesh network having access points wirelessly coupled by network links, an integrated interface to an access point, in which the integrated interface is a different transport medium than the network links, and receiving, via an integrated interface with an access point, a message packet from a user device. The integrated interface couples the access point independently of the wireless mesh network links for providing a higher performance link, such as a direct wired connection. The access point forwards, via a single wireless hop, the message packet to a root access point, the root access point responsive to a plurality of access points in the mesh network for subsequent connectivity with a service provider or backhaul network providing the network services.

Alternate configurations of the invention include a multi-programming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of a wireless device environment. The methods and apparatus depicted herein are presented in particular configurations for illustrating these methods and the apparatus on which they operate. In the wireless mesh network, a media content provider or other suitable Internet services provider delivers media content to end users, or subscribers through a backhaul connection to the Internet or other service provider network.

Figure 1:
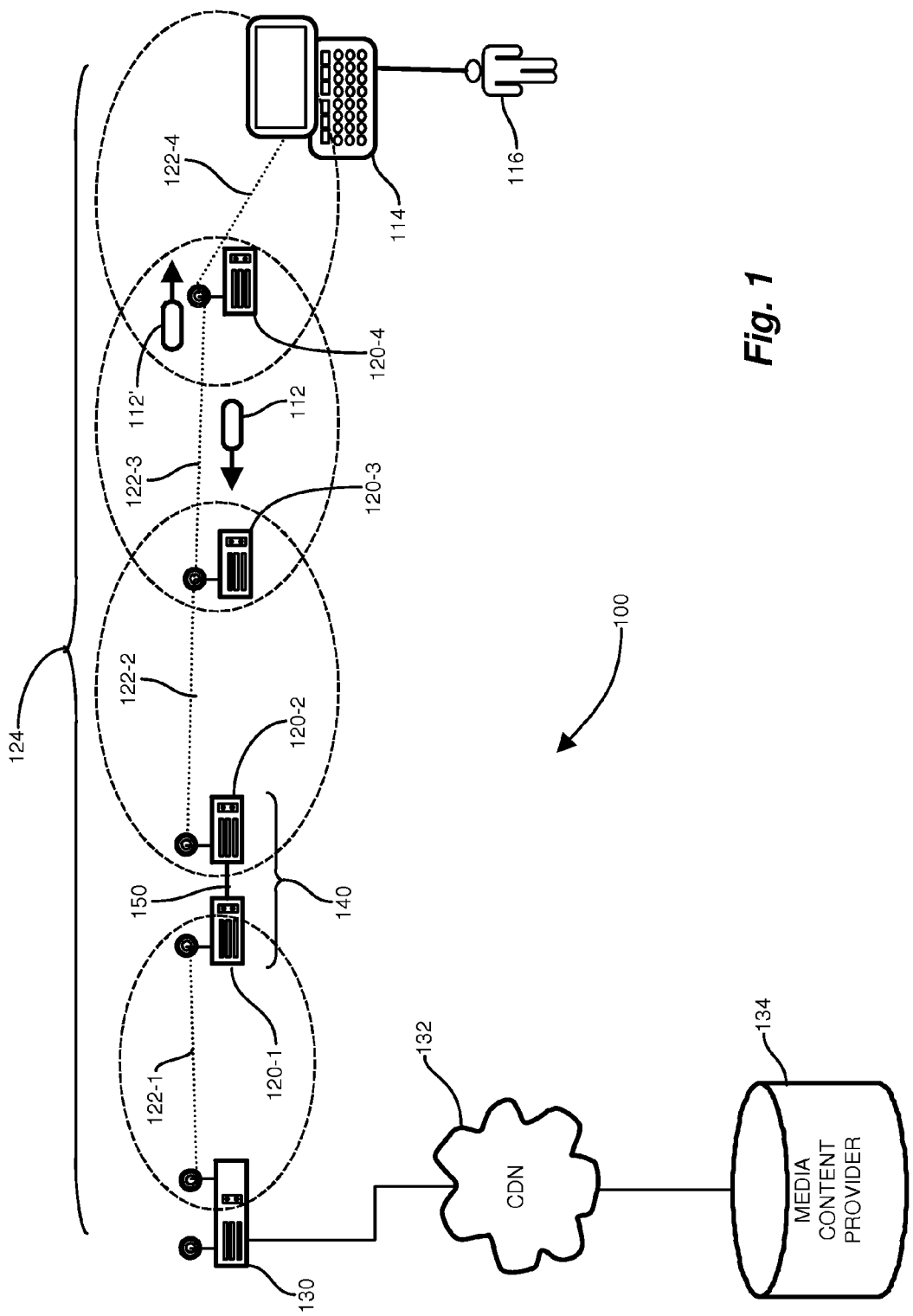
FIG. 1 is a context diagram of a wireless mesh network suitable for use with configurations herein.

FIG. 1 is a context diagram of a wireless mesh network suitable for use with configurations herein. Referring to FIG. 1, in a wireless environment 100, a user device 114 receives wireless services, typically in the form of message packets 112, 112' delivered to or received by a user device 114 on behalf of a user 116. The message packets 112 traverse a series of access points 120-1 ... 120-4 (120 generally) and a root access point 130. A series of wireless links 122-1 ... 122-4 (122 generally) provides a connection 124 between the root access point 130 and the user device 114 (subscriber device). The root access point 130 couples to a backhaul or content delivery network 132, typically a wired network such as the Internet for requesting and receiving the wireless services, typically message packets 112, from a media content provider 134 or other suitable Internet services provider for transport over the series of wireless links 122-N.

A plurality of access points, such as 120-1 and 120-2, are coupled as an integrated access point 140 via an integrated interface 150, thereby avoiding a wireless link 122 and allowing each access point 120-1, 120-2 to transport only upstream (toward the root access point 130) or downstream (toward the user device 114) wireless traffic, respectively. Each of the other access points 120-3 and 120-4 handles traffic in both the upstream (toward the root access point 130, or backhaul network side) or downstream (toward the user device 114, or access network side). The integrated interface 150 may be a wired interface, connecting to I/O ports or other hardwired interface on the access points 120-1 and 120-2, or may be another type of interconnection having lower latency (propagation delay) than the wireless links 122, discussed further below with respect to FIG. 4.

Figure 2:
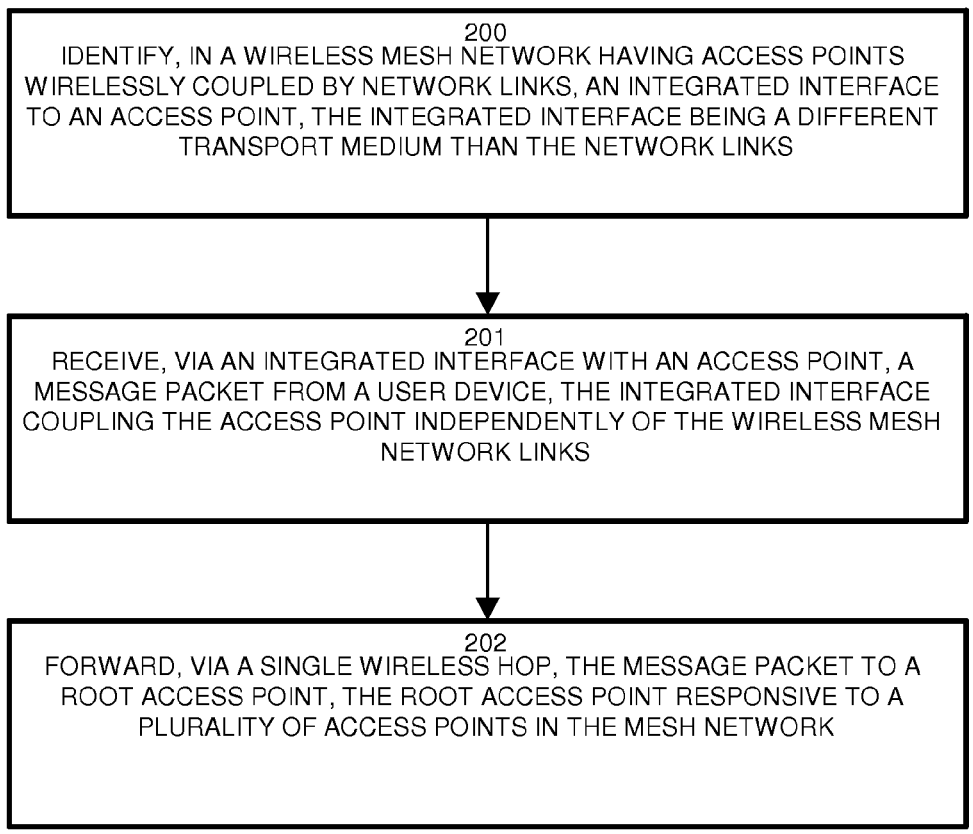
FIG. 2 is a flowchart of wireless transport in the wireless mesh network of FIG. 1.

FIG. 2 is a flowchart of wireless transport in the wireless mesh network of FIG. 1. Referring to FIGS. 1 and 2, the method of wireless data transport in a wireless mesh network environment 100 includes, at step 200, identifying, in the wireless mesh network having access points 120 wirelessly coupled by network links 122, an integrated interface 150 to an access point 120-1, such that the integrated interface 150 is a different transport medium than the network links 122. In the example configuration shown, the integrated interface is a wired connection between two access point in a so-called "back to back" arrangement. Message traffic transport includes receiving, via an integrated interface 150 with an access point 120, a message packet 112 from the user device, such that the integrated interface 150 couples the access point 120-1 independently of the wireless mesh network links 122, as depicted at step 201. Message traffic packets may be in either direction, such as message packet 112 from the user device 114, or message packet 112' to the user device. The access point 120-1 forwards, via a single wireless hop 122-1, the message packet 112 to the root access point 130, in which the root access point 130 is responsive to a plurality of access points 120 in the mesh network environment 100, as disclosed at step 202.

Figure 3:
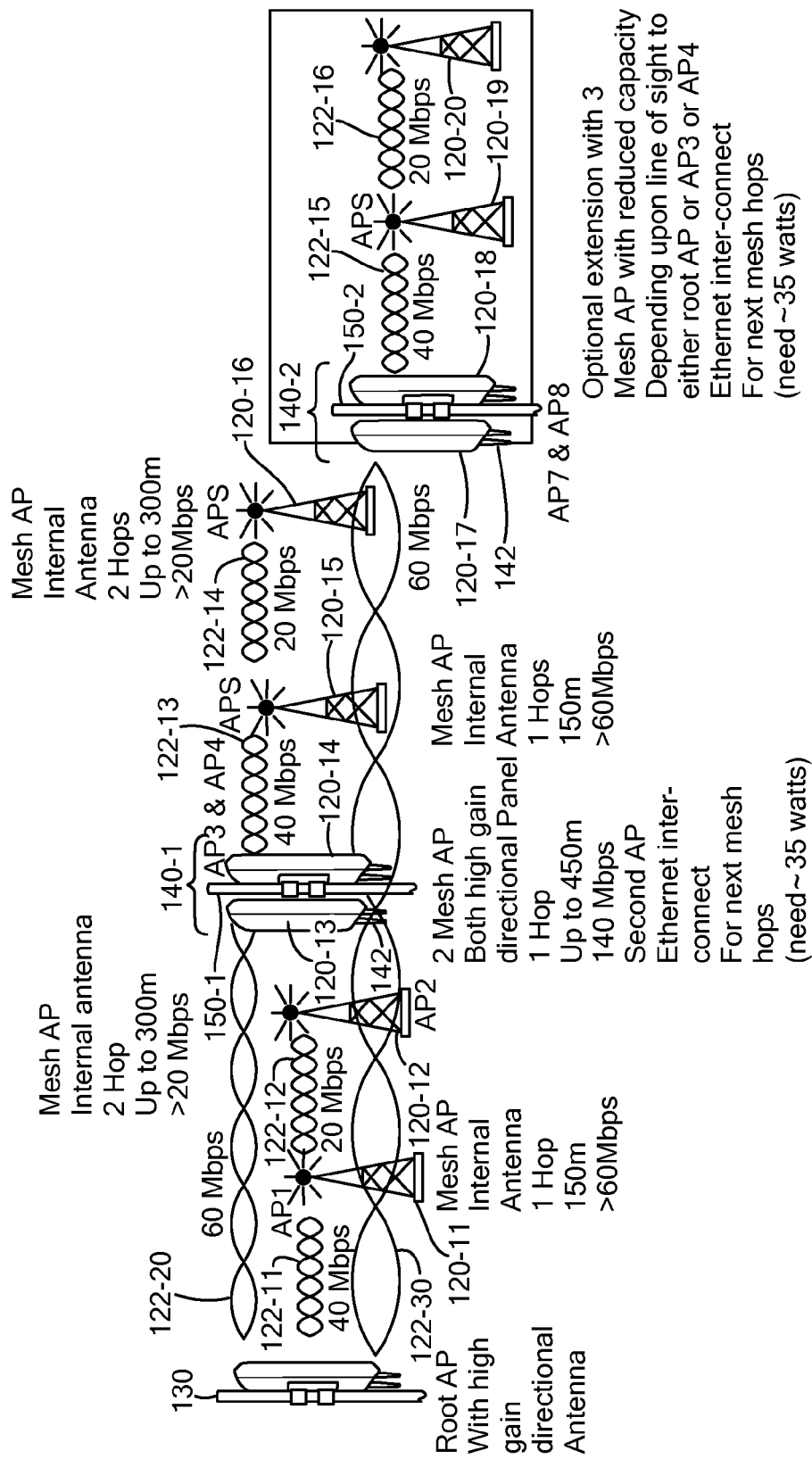
FIG. 3 shows a plurality of access points at varying distances from the root access point of FIG. 1.

FIG. 3 shows a plurality of access points at varying distances from the root access point of FIG. 1. Referring to FIGS. 1 and 3, a plurality of integrated access points 140-1 and 140-2 (140 generally) are deployed at varying distances from the root access point 130. Each of the integrated access points 140 couples to the root access point 130 using a high gain directional antenna 142 to provide high bandwidth wireless links 122-20 and 122-30. High bandwidth wireless link 122-20 couples to integrated access point 140-1 for serving access points 120-15 and 120-16. In the example arrangement, integrated access point 140-1 (access points 120-13 and 120-14) may be up to 150 meters from the root access point 130, and provide 40 Mbps and 20 Mbps to access points 120-15 and 120-16, respectively.

Integrated access point 140-2 (access points 120-17 and 120-18) similarly serve access points 120-19 and 120-20 via high bandwidth wireless link 122-30, and may be within range of either integrated access point 150-1 or the root access point 130. The root access point 130 also couples to access points 120-11 and 120-12 for covering user devices 114 within range. In a worst case example, using the maximum distance of access point 120-20, a conventional daisy chaining would incur 8 hops back to the root access point, resulting in a bandwidth drop of $2^8=\frac{1}{256}$ of the bandwidth provided by the root access point 130. In the disclosed approach, when the high gain directional link 122-30 is comparable to wireless links 120, access point 120-20 experiences only a $2^3=\frac{1}{8}$ drop, commensurate with a typical daisy chain configuration of 3 150 meter hops.

Figure 4:
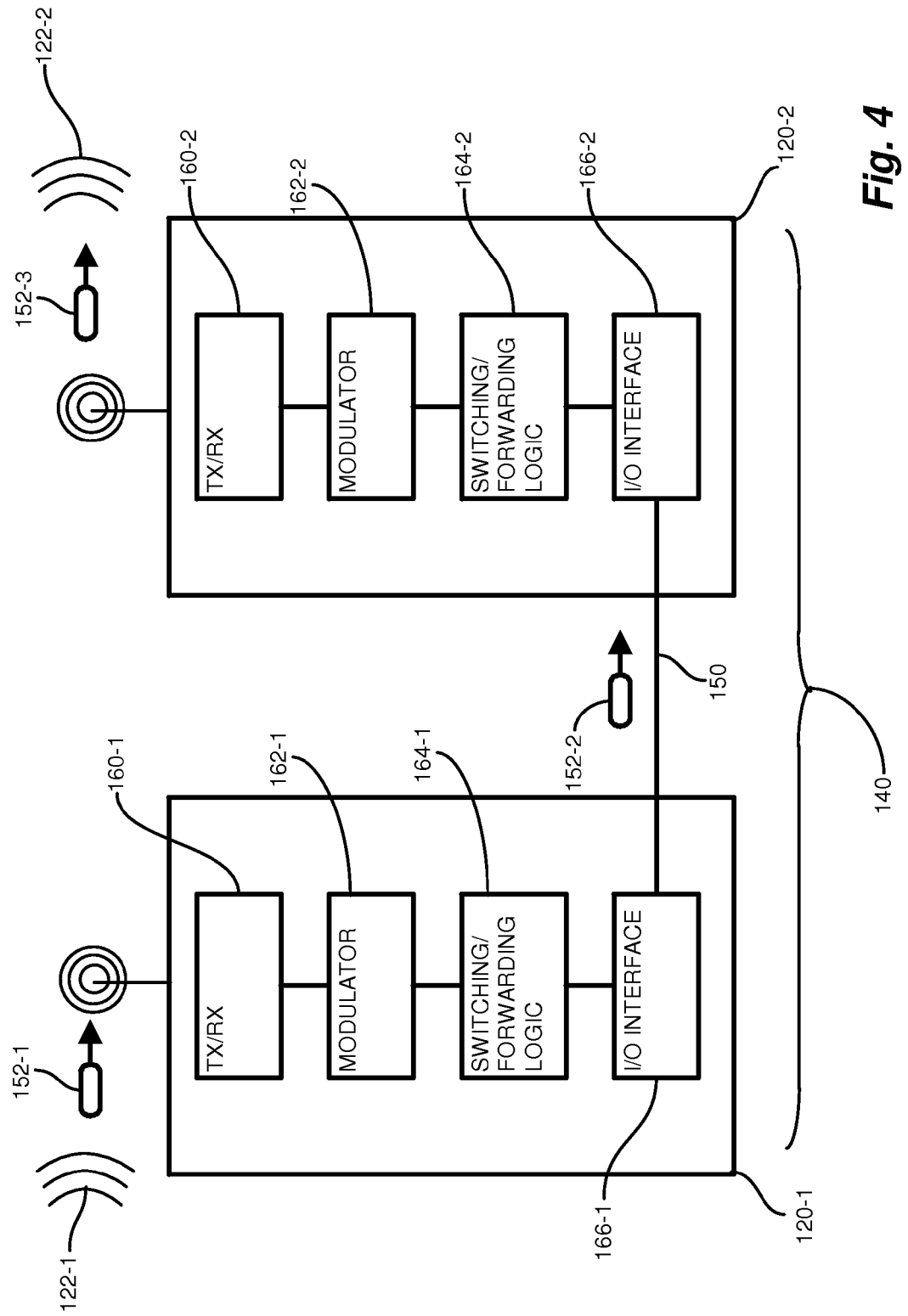
FIG. 4 shows access points coupled with an integrated interface in the network of FIG. 3.

FIG. 4 shows access points 120 coupled with an integrated interface 150 in the network of FIG. 3. Referring to FIGS. 1 and 4, access point 120-1 receives message traffic in the form of message packets 152-1 via wireless link 122-1. Access points 120-1 and 120-2 each include a wireless transmitter/receiver (TX/RX) 160-1 ... 160-2 (160 generally), modulator 162-1 ... 162-2 (162 generally), switching and forwarding logic 164-1 ... 164-2 (164 generally) and I/O interface 166-1 ... 166-2 (166 generally) for performing a wired transfer of message traffic 152-2 across the integrated interface 150. In the access network (downstream) direction shown, the TX/RX 160-1 receives message packet 152-1 over the wireless link 122-1, and demodulates it using the modulator 162-1. Switching/forwarding logic 164-1 identifies the next hop in the wireless mesh network as access point 120-2. In operation, the switching/forwarding logic identifies the next hop access point and corresponding link 122 depending on the mesh network configuration and an identified path. In the example shown, a next hop path is the integrated interface 150 to access point 120-2 defining the integrated access point 140. Switching/forwarding logic 166-1 passes the message packet 152-1 to the I/O interface 166-1, and the message packet 152-2 passes to an I/O interface 166-2 at access point 120-2. The message packet then traverses the switching/forwarding logic 164-2, modulator 162-2 and TX/RX 160-2 for wireless transmission over link 122-2, shown as message packet 152-

3. In this manner, transmission from access point 120-1 to 120-2 occurs over a wired medium provided by integrated interface 150, and mitigates wireless overhead that would otherwise be required for transport over a wireless link 122. Transport in the upstream (toward the access network) is provided similarly.

Figure 5:
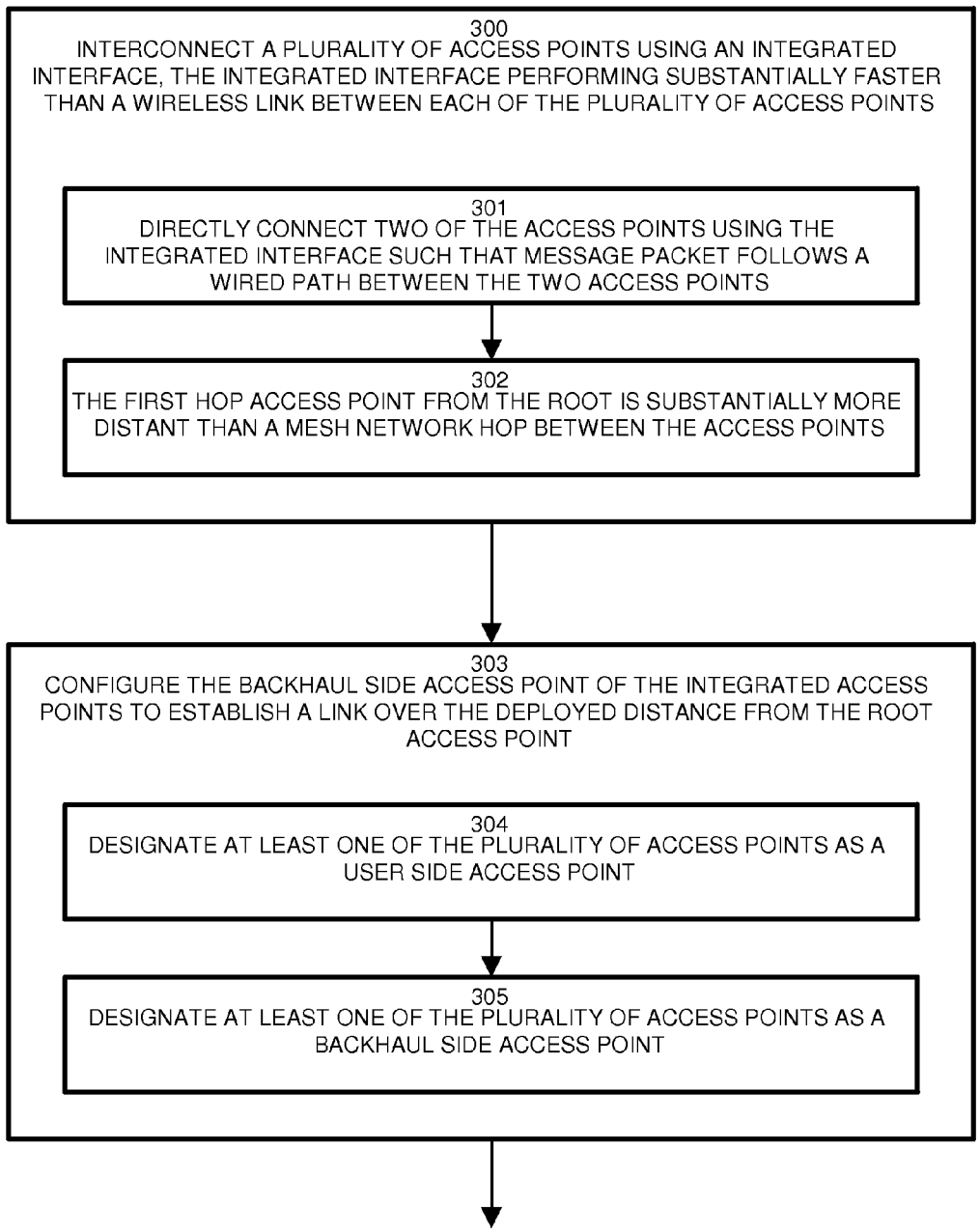
FIGS. 5-7 are a flowchart of mesh network configuration and transport in the network of FIG. 3.
Figure 6:
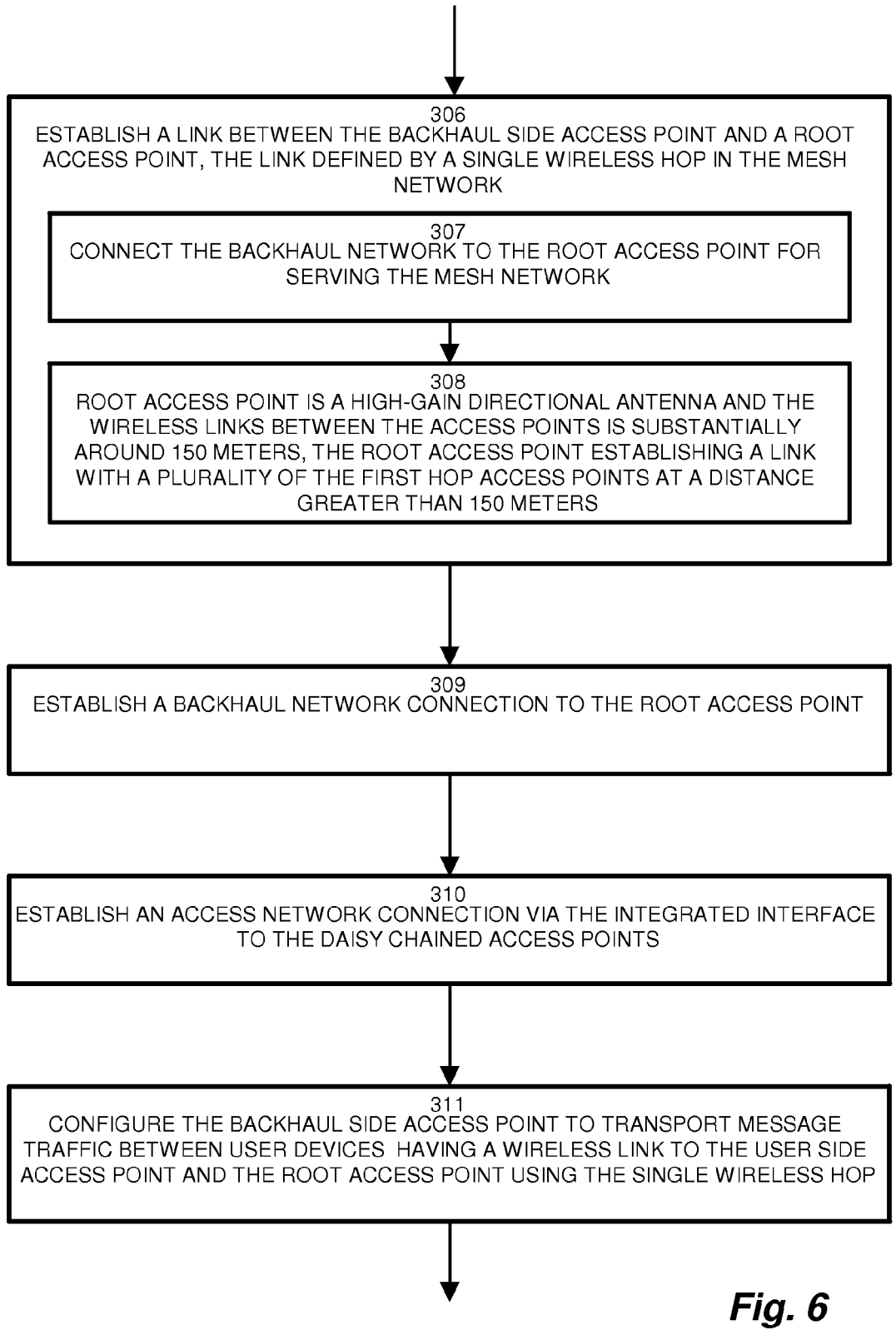
Figure 7:
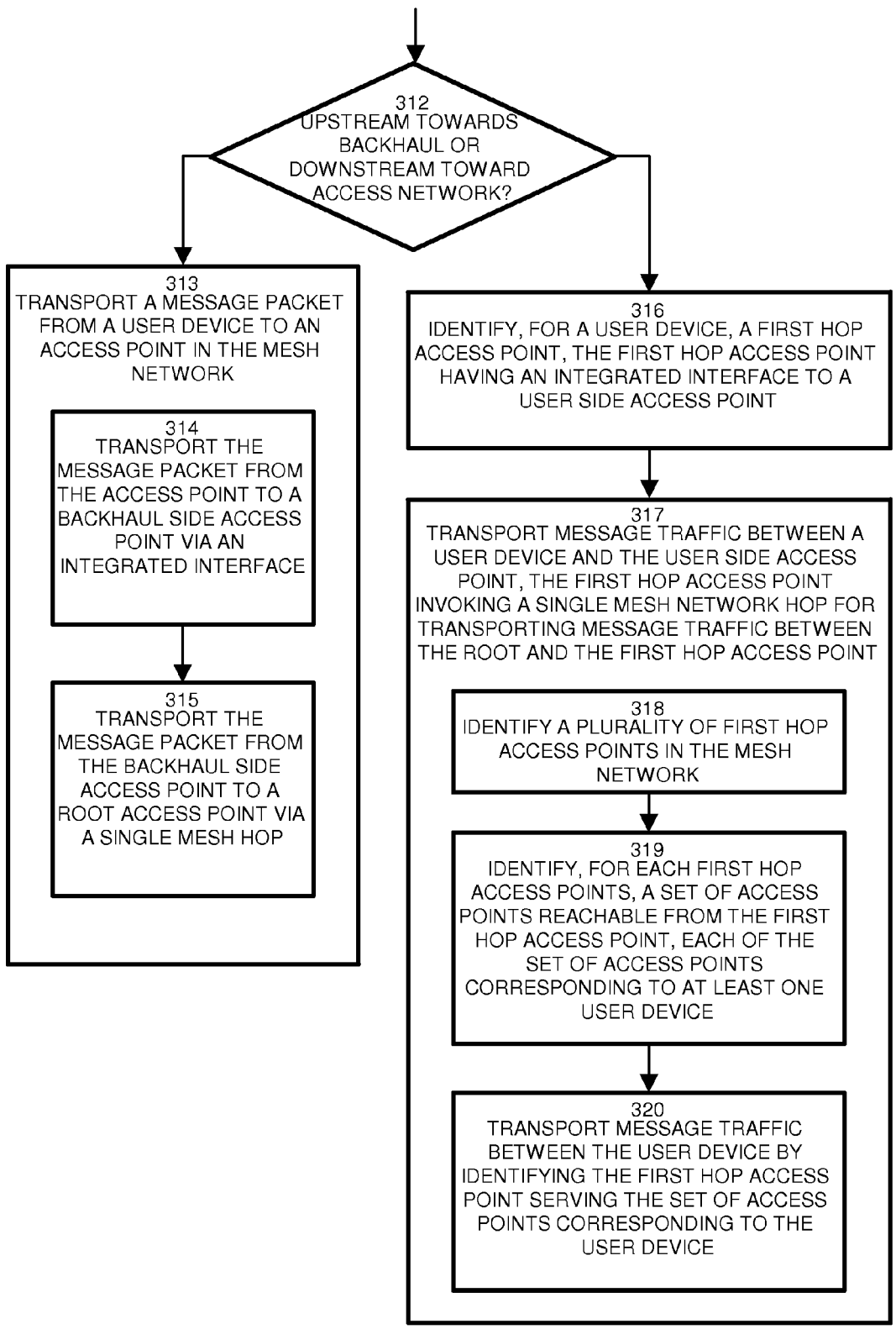

FIGS. 5-7 are a flowchart of mesh network configuration and transport in the network of FIG. 3. Referring to FIGS. 1, 3 and 5-7, at step 300, an operator or system administrator configures the mesh network by interconnecting a plurality of access points using an integrated interface, such that the integrated interface performs substantially faster than a wireless link 122 between each of the plurality of access points 120. In the example arrangement, the integrated interface 150 directly connects two of the access points using the integrated interface such a message packet 112, 112' follows a wired path between the two access points 120, as depicted at step 301. The first hop access point 120-1 from the root 130 may be substantially more distant than a mesh network (wireless) hop between the access points, as disclosed at step 302, due to the high gain directional nature of the antenna 142. Depending on the configuration, first hop access points such as those in integrated access point 140 may be deployed at varying distances and directions to cover the wireless mesh environment 100. The administrator then daisy chains a plurality of access points 120 including the integrated access point 140, such that daisy chaining terminates at the root access point 130. The daisy chaining configuration performs indirect relaying of the message packet 112, 112' between the user device 114 and the root access point 130 via the links 122 between each of the access points 120. In a particular configuration, each daisy-chained link in the mesh network mitigates throughput by a cumulative factor. A series of daisy chained wireless links 122 in conventional arrangements therefore rapidly results in a substantial reduction in throughput because the individual access points (120-3, 120-4 in the example shown) handle an intermediate receive, acknowledgement, send, and another acknowledgment for each relayed packet. The system administrator may deploy multiple integrated access points 140 distributed around the mesh network users 116, such that each integrated access point 140 is deployed at a successively farther distance from the root access point 130.

At the integrated access point 140, the system administrator configures the backhaul side access point 120-1 of the integrated access point 140 to establish a link over the deployed distance from the root access point 130, as depicted at step 303. This includes designating at least one of the plurality of access points 120-1 as a user side access point, as shown at step 304, and designating at least one of the plurality of access points 120-2 as a backhaul side access point, as depicted at step 305. A typical arrangement includes only two access points 120 for connection as an integrated access point 140, however additional access points 120 may be added to accommodate demand. The backhaul network, or content delivery network (CDN) 132 then connects to the root access point 130 for serving the mesh network.

A wireless link 122-1 is established between the backhaul side access point 120-1 and the root access point 130, such that the link 122-1 is defined by a single wireless hop in the mesh network, shown at step 306. The root access point is also connected to the backhaul network 132 for serving the mesh network, as disclosed at step 307. In the example arrangement, the root access point 130 includes a high-gain directional antenna, and the wireless links 122 between the access points span substantially around 150 meters, as depicted at step 308, in which the root access point 130 establishes a link with a plurality of the first hop access points 120-1 at a distance greater than 150 meters to enable suitable placement for the first hop integrated access points 140 around the environment 100.

A backhaul network connection to the root access point is established at step 309, and the first-hop access point 120-1 establishes an access network connection via the integrated interface to the daisy chained access points, 120-2 . . . 120-4 in the example shown, as depicted at step 310. The backhaul side access point 120-1 is also configured to transport message traffic between user devices 114 having a wireless link to the user side access point 120-2 and the root access point 130 using the single wireless hop 122-1, as shown at step 311.

Depending on the direction of the message packet 112, 112' (message traffic) at step 312, traffic is distinguished as either upstream towards backhaul or downstream toward access network. If the message packet 112 is toward the backhaul network 134, then the links 122 transport the message packet from the user device 114 to an access point 120 in the mesh network, as disclosed at step 313. The message traffic is defined by a series of message packets 112 or 112' between the user device and remote recipients via the root access point and the backhaul network, thus the operations described herein are repeatable for each packet in a transported stream, message or other sequential set of packets as defined by messaging protocols involved. This includes transporting the message packet 112 from the access point 120 to a backhaul side access point 130 via the integrated interface 150, as depicted at step 314. Upon reaching the integrated access point 140, the message packet 112 is transported from the backhaul side access point 120-1 to a root access point 130 via a single mesh hop 122-1, as disclosed at step 315.

In the case of a transmission from the root device at step 312, then the method of transporting data from a mesh network root 130 includes identifying, for a user device 114, a first hop access point 122-1, such that the first hop access point 120-1 has an integrated interface 150 to a user side access point 120-2, as depicted at step 316. The connection 124 transports message traffic 112 between the user device 114 and the user side access point 120-2, such that the first hop access point 120-1 invokes a single mesh network hop 122-1 for transporting message traffic between the root 130 and the first hop access point 120-1, as shown at step 317. This includes, at step 318 identifying a plurality of first hop access points in the mesh network, and identifying, for each first hop access point, a set of access points reachable from the first hop access point, each of the set of access points corresponding to at least one user device 116, as shown at step 319. Therefore, the root access point 130 determines, from available access points 122, which of the integrated access points 140 is daisy chained to an access point 120 serving the user device 114. The corresponding integrated access point 140 then transports the message traffic 112' between the user device 114 by identifying the first hop access point 120-1 serving the set of access points 120-2 . . . 120-4 corresponding to the user device 114, as depicted at step 320.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines.

The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of wireless data transport in a wireless mesh network comprising:
   identifying, in a wireless mesh network having access points wirelessly coupled by network links, an integrated interface to an access point, the integrated interface being a wired transport medium further comprising directly connecting two of the access points using the integrated interface such that message packet follows a wired path between the two connected access points including a first hop access point;
   receiving, via the integrated interface with an access point, a message packet from a user device, the integrated interface coupling the two connected access points independently of the wireless mesh network links; and
   forwarding, via a single wireless hop from the first hop access point, the message packet to a root access point, the root access point responsive to a plurality of successive access points in the mesh network, the root access point invoking a high-gain directional antenna, wherein the wireless links between successive access points are selected based on a distance to the root access point, maximum power usage and minimum throughput, the root access point establishing a link with a plurality of the first hop access points at a distance such that the first hop access point from the root is substantially more distant than a mesh network hop between the successive access points.

2. The method of claim 1 further comprising daisy chaining a plurality of access points, the daisy chain terminating at the root access point.

3. The method of claim 2 wherein the daisy chaining performs indirect relaying of the message packet between the user device and the root access point via the links between each of the access points.

4. The method of claim 3 wherein each daisy-chained link in the mesh network mitigates throughput by a cumulative factor.

5. The method of claim 2 further comprising
   connecting a backhaul network to the root access point for serving the mesh network,
   establishing a backhaul network connection to the root access point; and
   establishing an access network connection via the integrated interface to the daisy chained access points.

6. The method of claim 5 wherein the message traffic is defined by a series of message packets between the user device and remote recipients via the root access point and the backhaul network.

7. The method of claim 1 wherein the first hop from the root access point is a greater distance than successive wireless hops between the access points, and the successive access points consume no more than 35 watts.

8. The method of claim 1 wherein the message packet spans a maximum of two access points before receipt at the root access point.

9. A system for data transport in a wireless mesh network comprising:
   a plurality of wireless access points disposed for transporting a message packet between a user device and one of the plurality of access points in the mesh network, two of the access points directly connected such that message packet follows a wired path between the two directly connected access points;
   a root access point connected to a backhaul network and responsive to a plurality of backhaul side access points for message transport between the access points and the backhaul network;
   the access point configured for transporting the message packet between the access point and a backhaul side access point via the direct connection coupling the access point and the backhaul side access point via a wired medium; and
   the backhaul side access point for transporting the message packet from the backhaul side access point to the root access point via a single mesh hop; the backhaul side access point invoking a high-gain directional antenna at the root access point, wherein the wireless links between successive wireless hops to successive access points are located based on a distance to the root access point, maximum power usage and minimum throughput, the root access point establishing a link with a plurality of the first hop access points at a distance such that the backhaul side access point from the root is substantially more distant than a mesh network hop between the successive access points.

10. The system of claim 9 wherein:
    a backhaul network connects to the root access point for serving the mesh network; and
    the root access point establishes an access network connection via the integrated interface to the daisy chained access points.

11. The system of claim 9 wherein the root access point includes a high-gain directional antenna and the wireless links between the access points is substantially around 150 meters, the root access point establishing a link with a plurality of the first hop access points at a distance greater than 150 meters.

12. A system for wireless mesh network transport, comprising:
    a plurality of interconnected access points using an integrated wired interface for performing substantially faster than a wireless link between each of the plurality of access points;
    at least one of the plurality of access points designated as a user side access point;
    at least one of the plurality of access points designated as a backhaul side access point;
    a link between the backhaul side access point and a root access point, the link defined by a single wireless hop in the mesh network responsive to a high gain directional antenna at the root access point, the root access point greater than 150 meters distant and having a transport capacity of 160 Mbps;
    the backhaul side access point configured to transport message traffic between user devices having a wireless link to the user side access point and to the root access point using the established backhaul side link and the integrated interface;

a maximum of two intervening access points between the user side access point and the user device, each of the two intervening access points located based on a distance to the root access point, maximum power usage and minimum throughput and limited to 35 watts power consumption and 150 meters distance, the user device provided a transport capacity of 20 Mbps such that a first hop access point from the root is substantially more distant than a mesh network hop between the intervening access points.

13. The system of claim 12 further comprising:

deploying multiple of the integrated access points, each integrated access point deployed at a successively farther distance from the root access point; and configuring the backhaul side access point of the integrated access points to establish a link over the deployed distance from the root access point.

14. The system of claim 12 wherein the interconnected plurality of access points is defined by daisy chaining for indirect relaying of the message packet between the user device and the root access point via the links between each of the access points.

15. The system of claim 12 wherein a connection between the user device and a root access point comprises three wireless hops, the wireless hops including a hi gain directional antenna connection to a first access point, and two wireless hops of 150 meters between intervening access points;

further comprising a wired connection between the first access point and a second access point.

16. A network device for delivering media services to user devices, comprising:

a first hop access point wirelessly coupled to a root access point having a high gain directional antenna providing a high speed wireless link to the first hop access point, the root access point coupled to a backhaul network for providing content based services to user devices; and an Integrated interface including the first hop access point connected to a downstream access point by a wired interface;

the downstream access point wirelessly coupled to at least one successive access point for exchanging message traffic with a user device, the successive access point coupled to a downstream side of the integrated interface;

the first hop access point and the downstream access point connected by a wired interface for exchanging upstream and downstream message traffic, the first hop access point transporting downstream message traffic received from the root access point to the wired interface to the downstream access point, and the downstream access point transporting upstream message traffic received from a user device to the first hop access point via the wired interface;

the downstream access point and successive access point configured based on a distance to the root access point, maximum power usage and minimum throughput achievable;

a distance of the first hop access point from the root access point being substantially more distant than a distance between the downstream access point and successive access point.

17. The network device of claim 16 wherein the content based services have a greater downstream demand than upstream demand.

18. The network device of claim 16 wherein the message traffic includes media content for rendering on the user device and having a greater downstream demand.

19. The network device of claim 18 wherein the first hop access point, downstream access point, and successive access point are limited to 35 watts power consumption; and the user device is provided a service level of at least 20 Mbps.

20. The network device of claim 16 wherein the downstream access point couples via a wireless link to the user device.

* * * * *